US008718553B2

(12) United States Patent  (10) Patent No.: US 8,718,553 B2
Parekh et al.  (45) Date of Patent: May 6, 2014

(54) COMMUNICATIONS DEVICE AND METHOD FOR HAVING INTEGRATED NFC ANTENNA AND TOUCH SCREEN DISPLAY

(75) Inventors: Premal Parekh, Waterloo (CA); Amit Pal Singh, Waterloo (CA); Jeffery John Paul Dippel, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 152 days.

(21) Appl. No.: 13/359,916

(22) Filed: Jan. 27, 2012

(65) Prior Publication Data

US 2013/0196596 A1 Aug. 1, 2013

(51) Int. Cl.
 *H04B 5/00* (2006.01)
(52) U.S. Cl.
 USPC ........... 455/41.1; 455/41.2; 455/73; 345/156; 345/168
(58) Field of Classification Search
 USPC ............... 455/41.1, 41.2, 73, 550.1; 345/156, 345/168, 173
 See application file for complete search history.

(56) References Cited

U.S. PATENT DOCUMENTS

| 2004/0183788 A1 | 9/2004 | Kurashima et al. |
| 2004/0233172 A1 | 11/2004 | Schneider et al. |
| 2008/0230615 A1 | 9/2008 | Read et al. |
| 2008/0309633 A1 | 12/2008 | Hotelling et al. |
| 2009/0135156 A1 | 5/2009 | Lowles et al. |
| 2009/0167699 A1 | 7/2009 | Rosenblatt et al. |
| 2009/0287561 A1 | 11/2009 | Rybak et al. |
| 2010/0081374 A1 | 4/2010 | Moosavi |
| 2010/0088654 A1 | 4/2010 | Henhoeffer |
| 2010/0220064 A1 | 9/2010 | Griffin et al. |
| 2011/0070827 A1 | 3/2011 | Griffin et al. |
| 2011/0169770 A1 | 7/2011 | Mishina et al. |
| 2011/0273382 A1 | 11/2011 | Yoo et al. |
| 2011/0307891 A1 | 12/2011 | Orr et al. |
| 2012/0162032 A1* | 6/2012 | Yang et al. .................... 343/720 |

FOREIGN PATENT DOCUMENTS

| EP | 2387107 | 11/2011 |
| EP | 2403064 | 1/2012 |
| EP | 2416443 | 2/2012 |
| GB | 2471161 | 12/2010 |
| JP | 2003280815 | 10/2003 |

* cited by examiner

*Primary Examiner* — Tuan H Nguyen
(74) *Attorney, Agent, or Firm* — Allen, Dyer, Doppelt, Milbrath & Gilchrist, P.A.

(57) ABSTRACT

A communications device includes a housing and a wireless transceiver and processor carried by the housing and operative with each other. A Near Field Communications (NFC) circuit is carried by the housing and coupled to the processor. A touch screen display is connected to the processor. An NFC antenna is integrated with the touch screen display and coupled to the NFC circuit.

15 Claims, 3 Drawing Sheets

COMMUNICATIONS DEVICE AND METHOD FOR HAVING INTEGRATED NFC ANTENNA AND TOUCH SCREEN DISPLAY

TECHNICAL FIELD

This application relates to the field of communications, and more particularly, to mobile wireless communications devices and related methods that use Near Field Communications (NFC).

BACKGROUND

Mobile communication systems continue to grow in popularity and have become an integral part of both personal and business communications. Various mobile devices now incorporate Personal Digital Assistant (PDA) features such as calendars, address books, task lists, calculators, memo and writing programs, media players, games, etc. These multi-function devices usually allow users to send and receive electronic mail (email) messages wirelessly and access the Internet via a cellular network and/or a wireless local area network (WLAN), for example.

Some mobile devices incorporate contactless card technology and/or Near Field Communication chips. Near Field Communications technology is commonly used for contactless short-range communications based on radio frequency identification (RFID) standards, using magnetic field induction to enable communication between electronic devices, including mobile wireless communications devices. These short-range communications include payment and ticketing, electronic keys, identification, device set-up service and similar information sharing. This short-range high frequency wireless communications technology exchanges data between devices over a short distance, such as only a few centimeters.

As Near Field Communication (NFC) technology becomes more commonplace, it is often used with portable wireless communications devices in association with other short-range wireless communications such as a wireless Bluetooth connection. For example, an NFC connection is often used to establish a wireless Bluetooth connection in which data for establishing the Bluetooth connection is communicated. It is desirable also to accommodate NFC components such as the antenna in confined spaces of the device.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION

Figure 1:
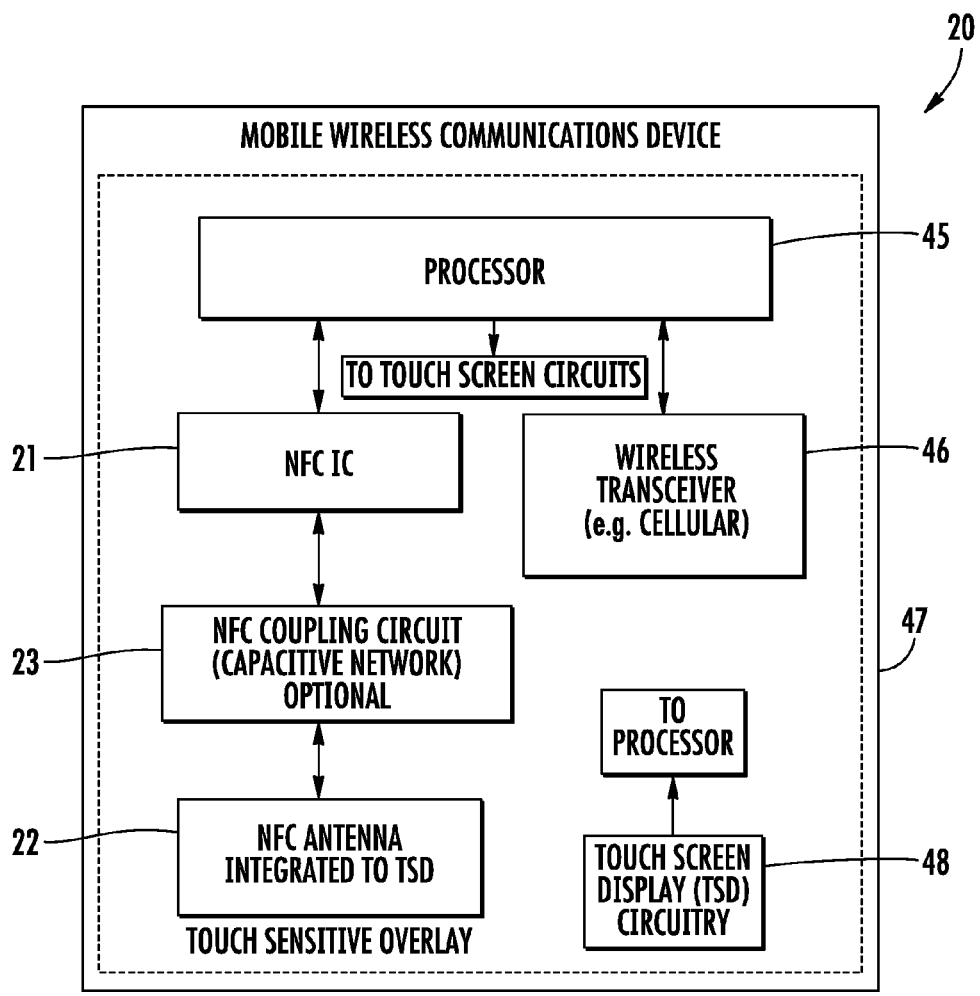
FIG. 1 is a high-level schematic circuit block diagram of an example embodiment of a mobile wireless communications device that uses a touch screen display and NFC antenna integrated therewith in accordance with a non-limiting embodiment.

Different embodiments will now be described more fully hereinafter with reference to the accompanying drawings, in which various embodiments are shown. Many different forms can be set forth and described embodiments should not be construed as limited to the embodiments set forth herein. Rather, these embodiments are provided so that this disclosure will be thorough and complete, and will fully convey the scope to those skilled in the art. Like numbers refer to like elements throughout.

A communications device includes a housing and a wireless transceiver and processor carried by the housing and operative with each other. A Near Field Communications (NFC) circuit is carried by the housing and coupled to the processor. A touch screen display is connected to the processor. An NFC antenna is integrated with the touch screen display and coupled to the NFC circuit.

In one example, the touch screen display includes a touch sensor pattern and the NFC antenna is integrated within the touch sensor pattern, which could be formed as alternating transmit and receive capacitive sensor lines. The touch sensor pattern could also be formed as a plurality of floating capacitive sensor islands. In another example, the touch screen display is formed as an elongate input touch pad formed as a layer of transparent conductive material such as indium tin oxide (ITO) touch pattern. The NFC antenna is etched within the ITO touch pattern in an example.

In another example, the processor is configured to display on the touch screen display a user interface. The housing in another example is configured as a handheld portable wireless communications device.

A method of making a communications device is also disclosed.

In accordance with non-limiting examples, the NFC antenna is embedded into the touch screen display that operates as a touch sensor and reduces the cost and thickness of the overall product. In one example, the NFC antenna is etched into the touch sensor pattern such as the indium tin oxide (ITO) touch pattern, thus becoming a part of the touch screen display and eliminating the requirement of having an extra layer of antenna.

Handheld electronic devices may have a number of different configurations. Examples of such devices include personal data assistants ("PDAs"), handheld computers, two-way pagers, cellular telephones, and the like. Many handheld electronic devices also feature wireless communication capability, although many other handheld electronic devices are stand-alone devices that are functional without communication with other devices.

Handheld electronic devices are generally intended to be portable, and thus, are typically a relatively compact configuration in which keys and other input structures often perform multiple functions under certain circumstances or may otherwise have multiple aspects or features assigned thereto.

In addition to using keys on a keypad, handheld electronic devices may also use a touch screen. A touch screen is typically a display screen overlay which provides the ability to display and receive information on the same display screen. The effect of the overlay is to allow a display screen to be used as an input device, removing the keys on the keypad as the primary input device for interacting with the display screen's content. Display screens with integrated touch screens can make computers and handheld electronic devices more useable. A touch screen or touch screen system typically includes a touch sensor, a controller or processor, and accompanying software. The controller communicates user selections to the processor of the electronic device in which the touch screen is used.

The LCD touch screen displays have an arrangement of touch sensors. In typical LCD touch screen displays, in order to provide a number of input pads in an X/Y matrix arrangement, the touch sensor can use two stacked indium tin oxide ("ITO") polyethylene terephthalate ("PET") polyester film layers. The first ITO PET film layer may include a number of rows of input pads (X inputs), the input pads in each row being connected in series. The second ITO PET film layer may include a number of columns of input pads (Y inputs), the input pads in each column being connected in series. These alternating rows and columns can operate as receive and transmit in some examples.

Referring now to FIG. 1, a mobile wireless communications device 20 according to the present disclosure is now described. The mobile wireless communications device 20 illustratively includes a housing 47 and a touch screen display 48 carried by the front of the housing and typically extending over the front in a substantially rectangular configuration. A wireless transceiver 46 is carried by the housing, and a processor 45 is carried by the housing and coupled to the wireless transceiver (e.g., cellular transceiver). The mobile wireless communications device 20 illustratively includes an NFC IC 21 carried by the housing 47 and coupled to the processor 45, an NFC antenna 22 carried by the housing, and in one example, an optional coupling circuit 23 between the NFC IC and the NFC antenna. The coupling circuit is not required but allows greater signal control in conjunction with the process.

The NFC IC 21 could include a plurality of terminals including a reference voltage terminal (e.g., ground voltage terminal), an antenna terminal, a receive terminal, and first and second AC charge terminals. The NFC IC 21 may be configured to cooperate with the processor 45 to operate in an IC card emulation mode (NFC device appears to an external reader as a traditional contactless smart card), a reader/writer mode (NFC device reads NFC tags), and a peer-to-peer mode (two NFC devices exchanging data).

In one example, the optional coupling circuit 23 could be formed as a capacitive network comprising a plurality of capacitors coupled in series with each other and in parallel with the NFC antenna 22 and a transmit branch and a receive branch. In another example, the coupling circuit could include first and second tuning branches and be reduced to a single tuning branch. The housing 47 can be formed as a rigid case for housing the various components of the communications device. The touch screen display 48 is typically mounted at the housing to form a front face of the rigid case. The case preferably frames the touch screen display and exposes it for user-interaction.

It should be understood that the touch screen display could use mutual capacitance having two distinct layers of material as described above in which one houses the driving lines that carry current and the other houses sensing lines that detect the current at nodes. It could also use self-capacitance that has one layer of individual electrodes that are connected with capacitance-sensing circuitry. Both approaches send the touch data as electrical impulses. It is possible for the processor based on the touch data to determine the features of each touch such as the size, shape and location of an effected area on the screen. It is possible for the processor to arrange the touches with similar features into groups and calculate various starting points and use gesture-interpretation.

The touch screen display 48 is formed in one example as a capacitive touch screen display. An example of a description of a touch screen display is described in commonly assigned U.S. Patent Publication No. 2010/0088654, the disclosure which is hereby incorporated by reference in its entirety. In one example embodiment, the capacitive touch screen display can include a display device and a touch-sensitive overlay that is a capacitive touch-sensitive overlay. It will be appreciated that the capacitive touch-sensitive overlay may include a number of layers in a stack and is fixed to the display device via a suitable optically clear adhesive. The layers can include, for example a substrate fixed to the display device (e.g., LCD display) by a suitable adhesive, a ground shield layer, a barrier layer, a pair of capacitive touch sensor layers separated by a substrate or other barrier layer, and a cover layer fixed to the second capacitive touch sensor layer by a suitable adhesive. The capacitive touch sensor layers can be any suitable material such as patterned indium tin oxide (ITO).

Each of the touch sensor layers could include an electrode layer each having a number of spaced apart transparent electrodes. The electrodes may be a patterned vapour-deposited ITO layer or ITO elements. The electrodes may be, for example, arranged in an array of spaced apart rows and columns. The touch sensor layers/electrode layers are each associated with a coordinate (e.g., x or y) in a coordinate system used to map locations on the touch screen display 48, for example, in Cartesian coordinates (e.g., x and y-axis coordinates). The intersection of the rows and columns of the electrodes may represent pixel elements defined in terms of an (x, y) location value which can form the basis for the coordinate system. Each of the touch sensor layers can provide a signal to the processor 45 or a separate controller, which represents respective x and y coordinates of the touch screen display 48. For example, x locations can be provided by a signal generated by one of the touch sensor layers and y locations can be provided by a signal generated by the other of the touch sensor layers.

The electrodes in the touch sensor layers/electrode layers respond to changes in the electric field caused by conductive objects in the proximity of the electrodes. When a conductive object is near or contacts the touch-sensitive overlay, the object draws away some of the charge of the electrodes and reduces its capacitance. The controller receives signals from the touch sensor layers of the touch-sensitive overlay, detects touch events by determining changes in capacitance which exceed a predetermined threshold, and determines the centroid of a contact area defined by electrodes having a change in capacitance which exceeds the predetermined threshold, typically in x, y (Cartesian) coordinates.

The processor 48 determines the centroid of the contact area of the device as the location of the touch event detected by the touch screen display. Depending on the touch-sensitive overlay and/or configuration of the touch screen display, the change in capacitance which results from the presence of a conductive object near the touch-sensitive overlay but not contact the touch-sensitive overlay, may exceed the predetermined threshold in which case the corresponding electrode would be included in the contact area. The detection of the presence of a conductive object such as a user's finger or a conductive stylus is sometimes referred to as finger presence/stylus presence.

It will be appreciated that other attributes of a touch event on the touch screen display can be determined. For example, the size and the shape (or profile) of the touch event on the touch screen display can be determined in addition to the location based on the signals received at the controller or processor from the touch sensor layers. For example, the touch screen display may be used to create a pixel image of the contact area created by a touch event. The pixel image is defined by the pixel elements represented by the intersection of electrodes in the touch sensor layers/electrode layers. The pixel image may be used, for example, to determine a shape or profile of the contact area.

The centroid of the contact area can be calculated by the processor based on raw location and magnitude (e.g., capacitance) data obtained from the contact area. The centroid is defined in Cartesian coordinates by the value $(X_c, Y_c)$. The centroid of the contact area is the weighted averaged of the pixels in the contact area and represents the central coordinate of the contact area. By way of example, the centroid may be found using the following equations:

$$X_c = \frac{\sum_{i=1}^{n} Z_i * x_i}{\sum_{i=1}^{n} Z_i}$$

$$Y_c = \frac{\sum_{i=1}^{n} Z_i * y_i}{\sum_{i=1}^{n} Z_i}$$

where $X_c$ represents the x-coordinate of the centroid of the contact area, $Y_c$ represents the y-coordinate of the centroid of the contact area, x represents the x-coordinate of each pixel in the contact area, y represents the y-coordinate of each pixel in the contact area, Z represents the magnitude (capacitance value or resistance) at each pixel in the contact area, the index i represents the electrodes in the contact area and n represents the number of electrodes in the contact area. Other methods of calculating the centroid will be understood to persons skilled in the art.

In this way, an interrupt signal which indicates a touch event has been detected, the centroid of the contact area, as well as raw data regarding the location and magnitude of the activated electrodes in the contact area are passed to the processor. However, in other embodiments only an interrupt signal which indicates a touch event has been detected and the centroid of the contact area are passed to the processor. In embodiments where the raw data is passed to the processor, the detection of a touch event (i.e., the application of an external force to the touch-sensitive overlay) and/or the determination of the centroid of the contact area may be performed by the processor of the device rather than the controller of the touch screen display.

Figure 2:
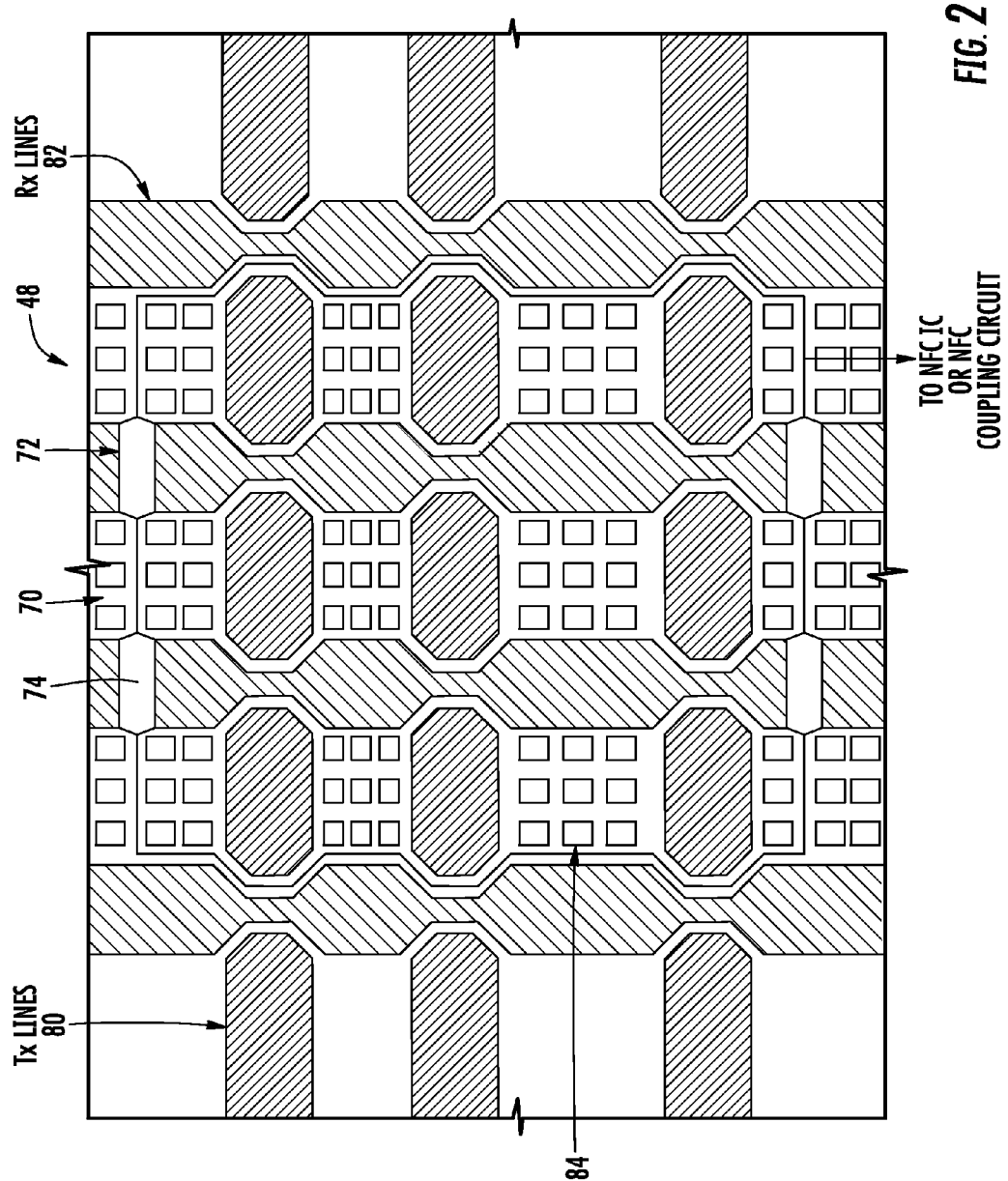
FIG. 2 is a plan view of the touch sensor pattern that includes the NFC antenna integrated with the touch screen display formed by the touch sensor pattern in accordance with a non-limiting example.

FIG. 2 shows the portion of the display 48 that includes a touch sensor pattern such as generally described above and illustrated generally at 70 and shows the NFC antenna 72 integrated within the touch sensor pattern. The NFC antenna 72 can include various loop elements 74. The touch sensor pattern includes alternating transmit and receive lines indicated generally at 80 and 82. Floating capacitive sensor islands 84 are also formed. This touch screen display can be formed as an elongate input touch pad formed over the entire front housing and formed as a layer of transparent conductive material such as an indium tin oxide (ITO) touch pattern as described above. The NFC antenna 72 is etched within the ITO touch pattern in one example. The loop element 74 can be positioned over receive lines 82 as illustrated. The NFC antenna is etched in a substantially rectangular pattern as illustrated.

Figure 3:
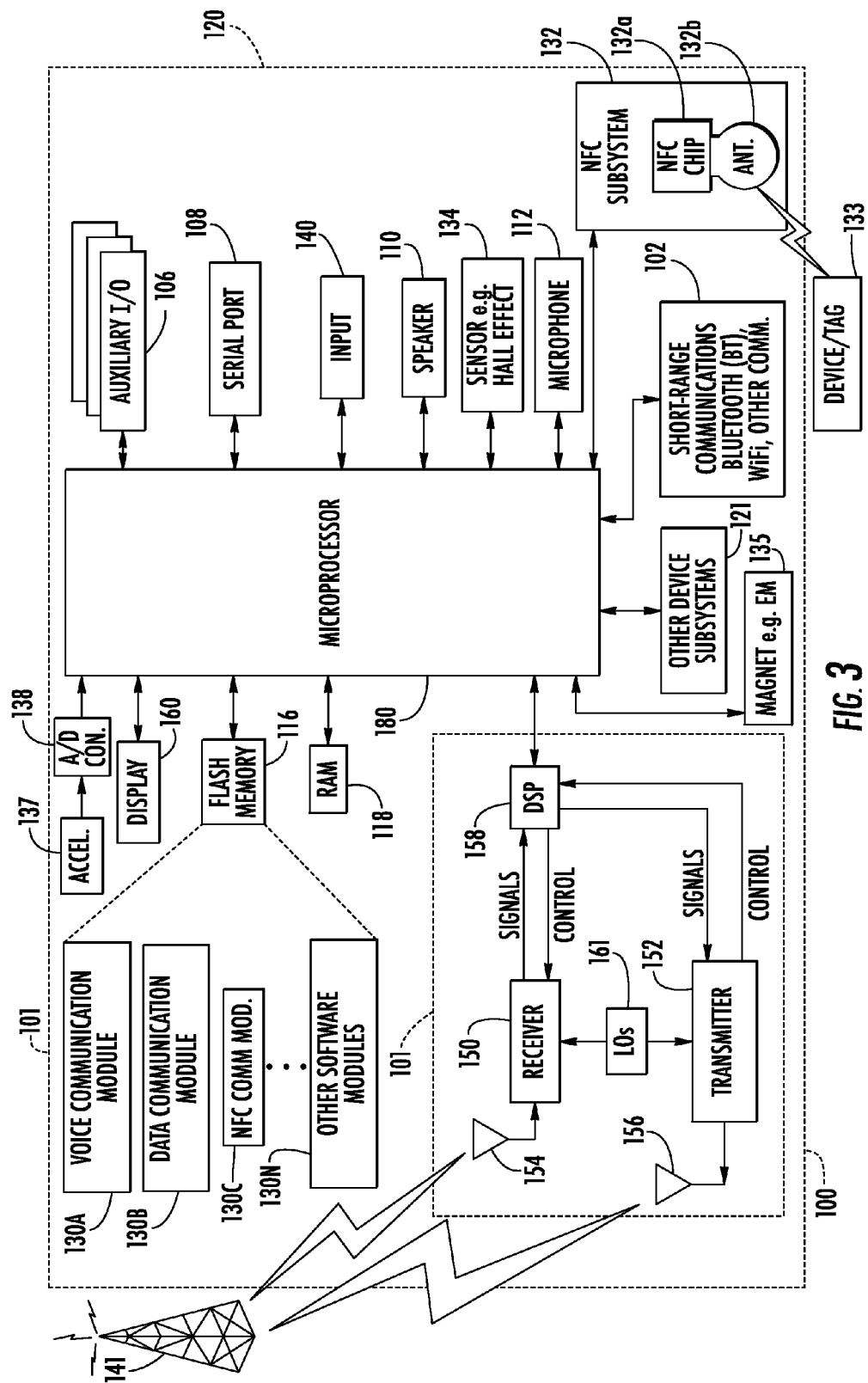
FIG. 3 is a high-level block diagram showing basic components of a portable wireless communications device that can incorporate the functionality of the communications device that includes the touch screen display and NFC antenna integrated therewith in accordance with a non-limiting example.

A non-limiting example of various functional components that can be used in the exemplary mobile wireless communications device 20 is further described in the example below with reference to FIG. 3. New reference numerals are used. Device 100 is an example embodiment of the device 20. The device 100 illustratively includes a housing 120, an input 140 and an output device 160. The input 140 could be circuitry connected to a touch sensitive input such as a display and/or a separate input, including a keyboard. The output device 160 shown is a display, which comprises a full graphic LCD and is touch sensitive as an input device in the example described above. Other types of output devices may alternatively be used. A processing device 180 is contained within the housing 120 and is coupled between the input 140 and the display 160. This device 180 is typically a microprocessor chip contained on a circuit board in the housing 120. When the display is a touch-activated display as described above, any keypad is not necessary. The processing device 180 controls the operation of the display 160, as well as the overall operation of the mobile device 100, in response to input by the user.

The housing 120 may be elongated vertically, or may take on other sizes and shapes (including clamshell housing structures). If a keypad is used in addition to a touch screen display, the keypad may include a mode selection key, or the device may include other hardware or software for switching between text entry and telephony entry.

In addition to the processing device 180, other parts of the mobile device 100 are shown schematically in FIG. 1. These include a communications subsystem 101; a short-range communications subsystem 102; the input 140 and the display 160, along with other input/output devices 106, 108, 110 and 112; as well as memory devices 116, 118 and various other device subsystems 121. The mobile device 100 is in this example a two-way RF communications device having voice and data communications capabilities using RF circuitry. In addition, the mobile device 100 has the capability to communicate with other computer systems via the Internet. The short-range communications subsystem 102 includes a Bluetooth (BT) communications module for establishing a Bluetooth wireless connection and other communications modules such as an infrared module or device, WiFi circuit and module, and associated components and circuits as part of RF circuitry.

Operating system software executed by the processing device 180 may be stored in a persistent store, such as the flash memory 116, or may be stored in other types of memory devices, such as a read only memory (ROM) or similar storage element. In addition, system software, specific device applications, or parts thereof, may be temporarily loaded into a volatile store, such as the random access memory (RAM) 118. Communications signals received by the mobile device may also be stored in the RAM 118.

The processing device 180, in addition to its operating system functions, enables execution of software applications 130a-130n on the device 100. A predetermined set of applications that control basic device operations, such as data and voice communications 130a and 130b, may be installed on the device 100 during manufacture. A Near Field Communications module 130C may also installed as illustrated.

The NFC communications module 130c as a software module cooperates with the microprocessor 180 through the flash memory 116. The microprocessor 180 operates also with the NFC subsystem 132 that includes a NFC chip 132a and antenna 132b that in the example above is integrated with the display that could communicate with another device/tag 133 in a non-limiting example. The NFC communications module 130c allows the microprocessor to control the NFC subsystem 132, which includes the NFC chip 132a and antenna 132b that is tuned typically for 13.56 MHz. The NFC chip 132a could be, for example, a PN531 microcontroller-based transmission module from the Phillips Semiconductor Branch of Koninklijke Phillips Electronics N.V. When the NFC chip is a PN531 module, the NFC chip 132*a* could include analog circuitry and a contact list Universal Asynchronous Receiver Transmitter (UART), a core and a set of host interfaces. The analog circuitry could include an output driver, an integrated demodulator, a bit decoder, a mode detector and an RF-level detector. The contact list DART could include elements for data processing, Cyclical Redundancy Checking (CFC), parity generation, framing generation and check bit coding and decoding. The core typically includes an 80051 microcontroller, 32 Kbyte of ROM and one Kbyte of RAM. A set of host interfaces can interface with the microprocessor and interface according to such known standards as I2C, serial UART, SPI and USB.

There is also illustrated a magnetic sensor 134 that could be formed as a Hall Effect sensor and is connected to the microprocessor 180. It includes the various components that operate as a Hall Effect sensor, including any necessary coils or other circuits. There is also illustrated a magnet 135 that, in one example, is formed as an electromagnet and operates with the microprocessor to allow a different communications pathway using electromagnetic energy that is changed to correspond to changing data. This electromagnet 135 has different functions, including working as an active or passive device in association with other components of the device 100 as illustrated. For example, when the electromagnet 135 is used in place of an installed magnet (non-electromagnetic) in the device of FIG. 1, a pulse of energy could be delivered to the Hall Effect sensor in another device. The other device receives the pulse and establishes a Bluetooth connection without going through activation of the NFC circuit. A WiFi connection, for example, in the alternative is established if a Bluetooth connection is not established. Other software modules 130*n* include software that interoperates with the magnetic sensor 134 and any magnet or electromagnet 135 or other magnetic circuitry that are included within the overall electromagnet 135.

An accelerometer 137 and an analog/digital converter 138 could be connected to the microprocessor 180 as illustrated and allow another implementation of an NFC automatic tag detection (and automatic peer-to-peer detection). The accelerometer 137 could recognize the tapping of a communications device against a tag or another device, i.e., recognizes the vibrations. Instead of using the Hall effect sensors and magnets to wake up the NFC circuit, the circuit uses tap recognition, for example, as a vibration sensor and accelerometer in this example. It should be understood that when the device is tapped against another object, for example, an NFC tag, a profile is generated as a matter of certain accelerometer parameters being met or exceeded. If the profile is compared against a known tap profile, it will wake the NFC circuit and initiate communication. In other embodiments, the accelerometer could be part of a motion sensor system and other motion sensor systems other than an accelerometer could be used such as a cadence sensor or cadence detection system.

As will be appreciated by persons skilled in the art, an accelerometer is a sensor which converts acceleration from motion (e.g., movement of the communications device or a portion thereof due to the strike force) and gravity which are detected by a sensing element into an electrical signal (producing a corresponding change in output) and is available in one, two or three axis configurations. Accelerometers may produce digital or analog output signals depending on the type of accelerometer. Generally, two types of outputs are available depending on whether an analog or digital accelerometer is used: (1) an analog output requiring buffering and analog-to-digital (A/D) conversion; and (2) a digital output which is typically available in an industry standard interface such as an SPI (Serial Peripheral Interface) or I2C (Inter-Integrated Circuit) interface. The embodiment shown in FIG. 3 illustrates an analog output into the A/D converter 138. The output of an accelerometer is typically measured in terms of the gravitational acceleration constant at the Earth's surface, denoted g, which is approximately 9.81 m/s$^2$ (32.2 ft/s$^2$) as the standard average. The accelerometer may be of almost any type including, but not limited to, a capacitive, piezoelectric, piezoresistive, or gas-based accelerometer. The range of accelerometers varies up to the thousands of g's, however for portable electronic devices "low-g" accelerometers may be used. Example low-g accelerometers which may be used are MEMS digital accelerometers from Analog Devices, Inc. (ADI), Freescale Semiconductor, Inc. (Freescale) and STMicroelectronics N.V. of Geneva, Switzerland.

The operational settings of the accelerometer, in one example, are controlled using control signals sent to the accelerometer via a serial interface. In one illustrated example, the microprocessor determines the motion detection in accordance with the acceleration measured by the accelerometer. Raw acceleration data measured by the accelerometer, in another example, is sent to the microprocessor via a serial interface where motion detection is determined by the operating system or other software module. In other embodiments, a different digital accelerometer configuration could be used, or a suitable analog accelerometer and control circuit could be used.

In addition, a personal information manager (PIM) application may be installed during manufacture. The PIM is capable of organizing and managing data items, such as email, calendar events, voice mails, appointments, and task items. The PIM application is also capable of sending and receiving data items via a wireless network 141. The PIM data items are seamlessly integrated, synchronized and updated via the wireless network 141 with the device user's corresponding data items stored or associated with a host computer system.

Communication functions, including data and voice communications, are performed through the communications subsystem 101, and possibly through the short-range communications subsystem 120, which are part of RF circuitry contained on a circuit board typically as shown by the outline. The communications subsystem 101 includes a receiver 150, a transmitter 152, and one or more antennae 154 and 156. In addition, the communications subsystem 101 also includes a processing module, such as a digital signal processor (DSP) 158, and local oscillators (LOs) 161 as part of RF circuitry in this example. The specific design and implementation of the communications subsystem 101 is dependent upon the communications network in which the mobile device 100 is intended to operate. For example, the mobile device 100 may include a communications subsystem 101 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be used with the mobile device 100.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore typically utilizes a subscriber identity module, commonly referred to as a SIM card, in order to operate on a GPRS network.

When required network registration or activation procedures have been completed, the mobile device 100 sends and receives communications signals over the communication network 141. Signals received from the communications network 141 by the antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communications functions, such as demodulation and decoding. In a similar manner, signals to be transmitted to the network 141 are processed (e.g., modulated and encoded) by the DSP 158 and are then provided to the transmitter 152 for digital to analog conversion, frequency up conversion, filtering, amplification and transmission to the communication network 141 (or networks) via the antenna 156.

In addition to processing communications signals, the DSP 158 provides for control of the receiver 150 and the transmitter 152. For example, gains applied to communications signals in the receiver 150 and transmitter 152 may be adaptively controlled through automatic gain control algorithms implemented in the DSP 158.

In a data communications mode, a received signal, such as a text message or web page download, is processed by the communications subsystem 101 and is input to the processing device 180. The received signal is then further processed by the processing device 180 for an output to the display 160, or alternatively to some other auxiliary I/O device 106. A device user may also compose data items, such as e-mail messages, using the input 140 and/or some other auxiliary I/O device 106, such as a touchpad, a trackball, a trackpad, a rocker switch, a thumb-wheel, or some other type of input device. The composed data items may then be transmitted over the communications network 141 via the communications subsystem 101.

In a voice communications mode, overall operation of the device is substantially similar to the data communications mode, except that received signals are output to a speaker 110, and signals for transmission are generated by a microphone 112. Alternative voice or audio I/O subsystems, such as a voice message recording subsystem, may also be implemented on the device 100. In addition, the display 160 may also be used in voice communications mode, for example to display the identity of a calling party, the duration of a voice call, or other voice call related information and whether there are NFC communications or a Bluetooth connection.

Any short-range communications subsystem enables communication between the mobile device 100 and other proximate systems or devices, which need not necessarily be similar devices. For example, the short-range communications subsystem may include an infrared device and associated circuits and components as described above, or a Bluetooth communications module to provide for communication with similarly-enabled systems and devices as well as the NFC communications.

In accordance with various embodiments, GSM is an exemplary communications system and uses a radio interface that can have an uplink frequency band and downlink frequency band with about 25 MHz bandwidth, typically subdivided into 124 carrier frequency channels, each spaced about 200 KHz apart as non-limiting examples. Time division multiplexing is usually used to allow about 8 speech channels per radio frequency channel, giving 8 radio time slots and 8 burst periods grouped into what is called a TDMA frame. For example, a channel data rate is typically about 270.833 Kbps and a frame duration of about 4.615 milliseconds (MS) in one non-limiting example. The power output usually varies from about 1 to about 2 watts.

Typically, linear predictive coding (LPC) is used to reduce the bit rate and provide parameters for a filter to mimic a vocal track with speech encoded at about 13 Kbps. Four different cell sizes are typically used in a GSM network, including macro, micro, pico and umbrella cells. A base station antenna is typically installed on a master building above the average rooftop level in a macrocell. In a macrocell, the antenna height is typically under the average rooftop level and used in urban areas. Microcells typically have a diameter of about a few dozen meters and are used indoors. Umbrella cells usually cover shadowed regions or smaller cells. Typically, the longest distance for the GSM specification covered by an antenna is about 22 miles depending on antenna height, gain and propagation conditions.

GSM systems typically include a base station subsystem, a network and switching subsystem, and a General Packet Radio Service (GPRS) core network. A subscriber identity module (SIM) is usually implemented in the communications device, for example, the well-known SIM card, similar to a smart card containing the subscription information and phone book of a user. The user typically switches handsets or could change operators by changing a SIM. USIM, RUIM or CSIM and other similar technologies can be used in UMTS or CDMA networks.

The GSM signaling protocol has three general layers. Layer 1 is a physical layer using channel structures above the air interface. Layer 2 is the data link layer. Layer 3 is a signaling protocol, which includes three sublayers. These include a Radio Resources Management sublayer to control the setup, maintenance and termination of radio and fixed channels, including handovers. A Mobility Management sublayer manages the location updating and registration procedures and secures the authentication. A Connection Management sublayer handles general call control and manages supplementary services and the short message service. Signaling between different entities such as the Home Location Register (HLR) and Visiting Location Register Nilo can be accomplished through a Mobile Application Part (MAP) built upon the Transaction Capabilities Application Part (TCAP) of the top layer of the Signaling System No. 7.

A Radio Resources Management (RRM) sublayer typically oversees the radio and fixed link establishment between the mobile station and an MSE.

It is also possible to used Enhanced Data Rates for GSM Evolution (EDGE), as an enhancement to General Packet Radio Service (GPRS) networks. EDGE typically uses 8 Phase Shift Keying (8 PSK) and Gaussian Minimum Shift Keying (GMSK) for different modulation and coding schemes. A three-bit word is usually produced for every changing carrier phase. A rate adaptation algorithm typically adapts the Modulation and Coding Scheme (MCS) according to the quality of the radio channel and the bit rate and robustness of data transmission. Base stations are typically modified for EDGE use.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A communications device, comprising:
a housing;
a wireless transceiver and processor carried by the housing and operative with each other;
a Near Field Communications (NFC) circuit carried by said housing and coupled to the processor;
a touch screen display connected to the processor;
an NFC antenna integrated with the touch screen display and coupled to the NFC circuit; and
wherein said touch screen display comprises a touch sensor pattern formed as alternating transmit and receive capacitive sensor lines and said NFC antenna is integrated within the touch sensor pattern and includes loop elements positioned over receive capacitive sensor lines.

2. The communications device according to claim 1, wherein said touch sensor pattern comprises a plurality of floating capacitive sensor islands.

3. The communications device according to claim 1, wherein said touch screen display comprises an elongate input touch pad formed as a layer of transparent conductive material.

4. The communications device according to claim 3, wherein said transparent conductive material comprises an indium tin oxide (ITO) touch pattern.

5. The communications device according to claim 4, wherein said NFC antenna is etched within the ITO touch pattern.

6. The communications device according to claim 1, wherein said processor is configured to display on the touch screen display a user interface.

7. The communications device according to claim 1, wherein said housing is configured as a handheld portable wireless communications device.

8. A communications device, comprising:
a housing;
a processor carried by the housing;
a Near Field Communications (NFC) circuit carried by said housing and coupled to the processor;
a touch screen display connected to the processor;
an NFC antenna integrated with the touch screen display and coupled to the NFC circuit; and
wherein said touch screen display comprises a touch sensor pattern formed as alternating transmit and receive capacitive sensor lines and said NFC antenna is integrated within the touch sensor pattern and includes loop elements positioned over receive capacitive sensor lines.

9. The communications device according to claim 8, wherein said touch sensor pattern comprises a plurality of floating capacitive sensor islands.

10. The communications device according to claim 8, wherein said touch screen display comprises an elongate input touch pad formed as a layer of transparent conductive material.

11. The communications device according to claim 10, wherein said transparent conductive material comprises an indium tin oxide (ITO) touch pattern.

12. A method of making a communications device, comprising:
providing a wireless transceiver and processor coupled to the wireless transceiver, a Near Field Communications (NFC) circuit coupled to the processor and a touch screen display connected to the processor;
integrating an NFC antenna with the touch screen display and coupled to the NFC circuit;
forming the touch screen display as a touch sensor pattern formed as alternating transmit and receive capacitive sensor lines;
forming loop elements in the NFC antenna; and
positioning the loop elements over receive capacitive sensor lines.

13. The method according to claim 12, and further comprising forming a plurality of floating capacitive sensor islands.

14. The method according to claim 12, and further comprising forming a layer of transparent conductive material.

15. The method according to claim 14, and further comprising forming the transparent conductive material as an indium tin oxide (ITO) touch pattern.

* * * * *